Oct. 17, 1961   L. E. MENDOZA ET AL   3,005,083
ELECTRO-HEATER
Filed Oct. 29, 1958   3 Sheets-Sheet 1
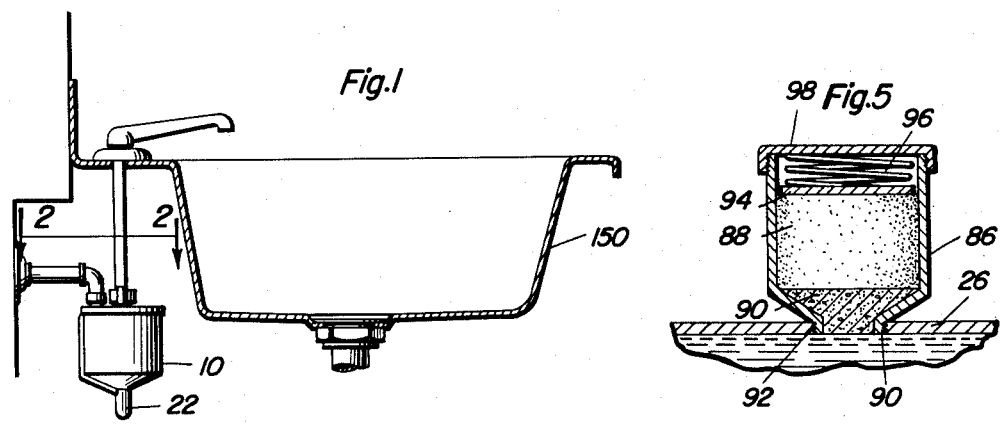
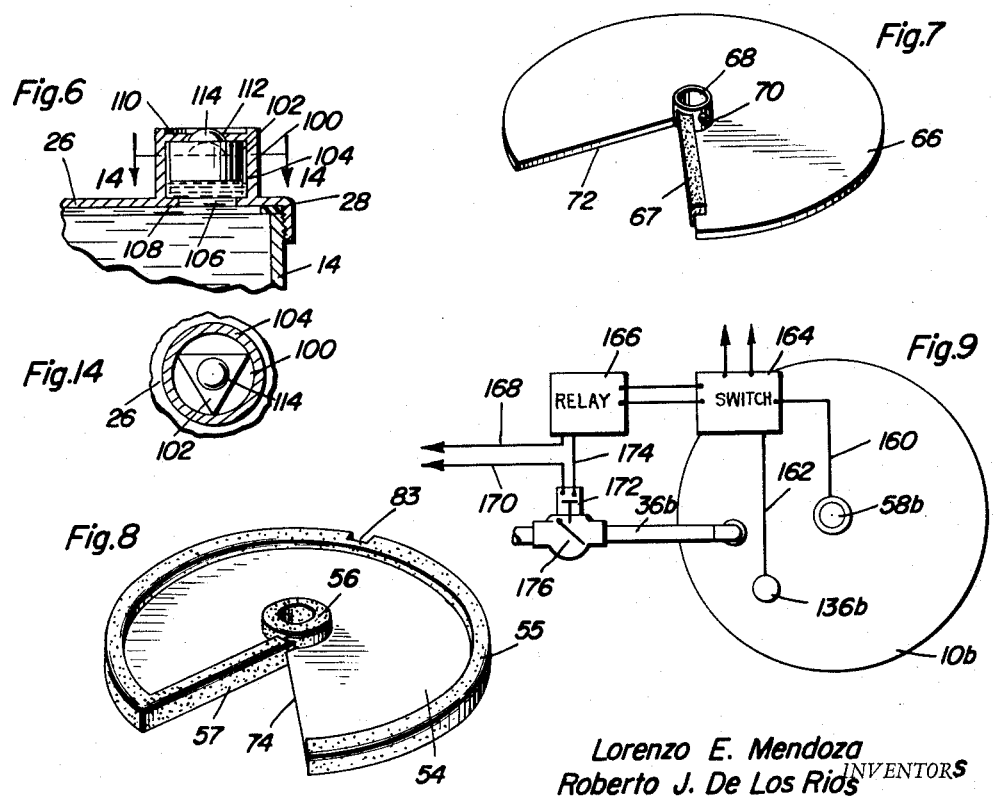
Lorenzo E. Mendoza
Roberto J. De Los Rios   INVENTORS

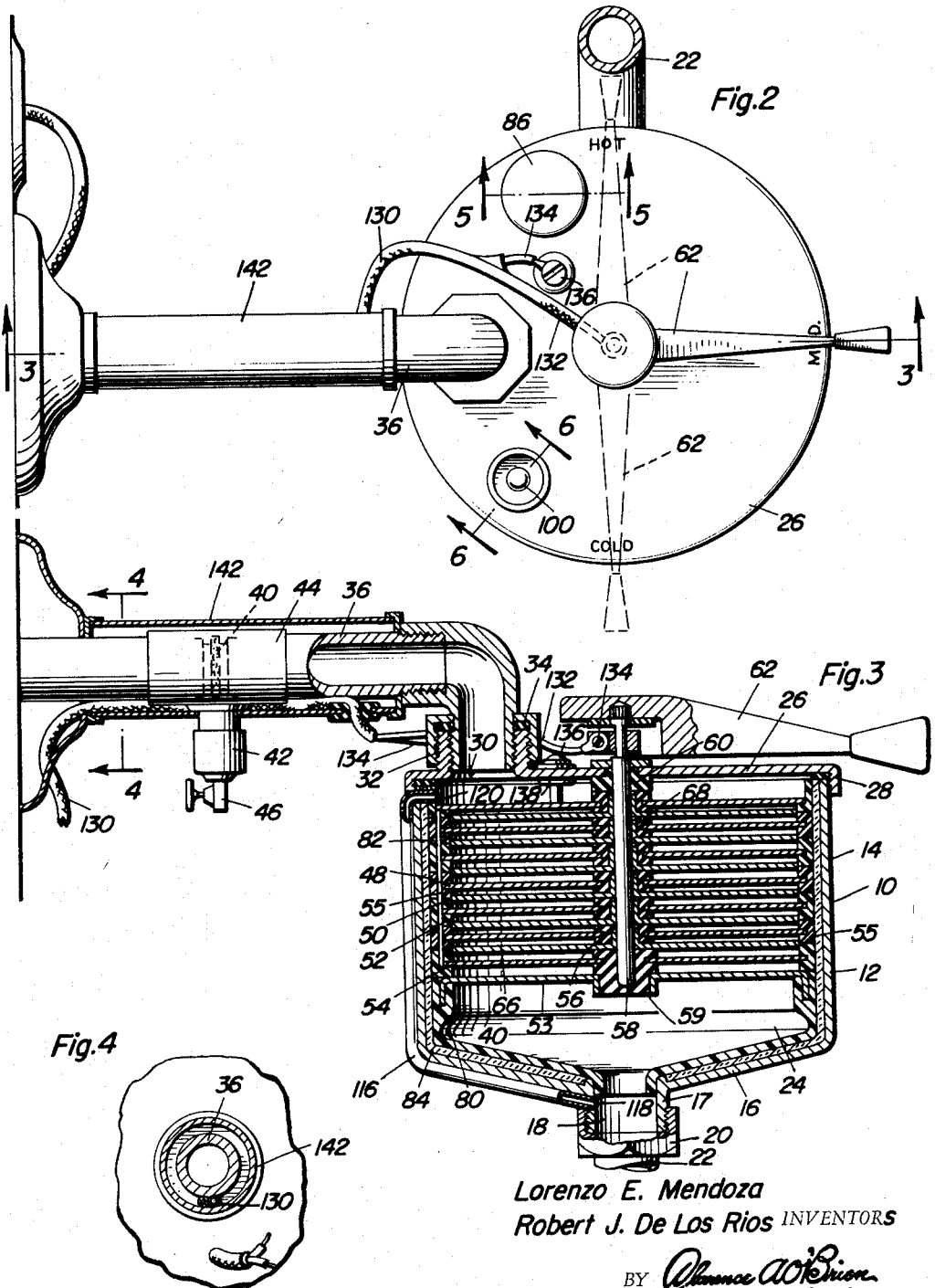

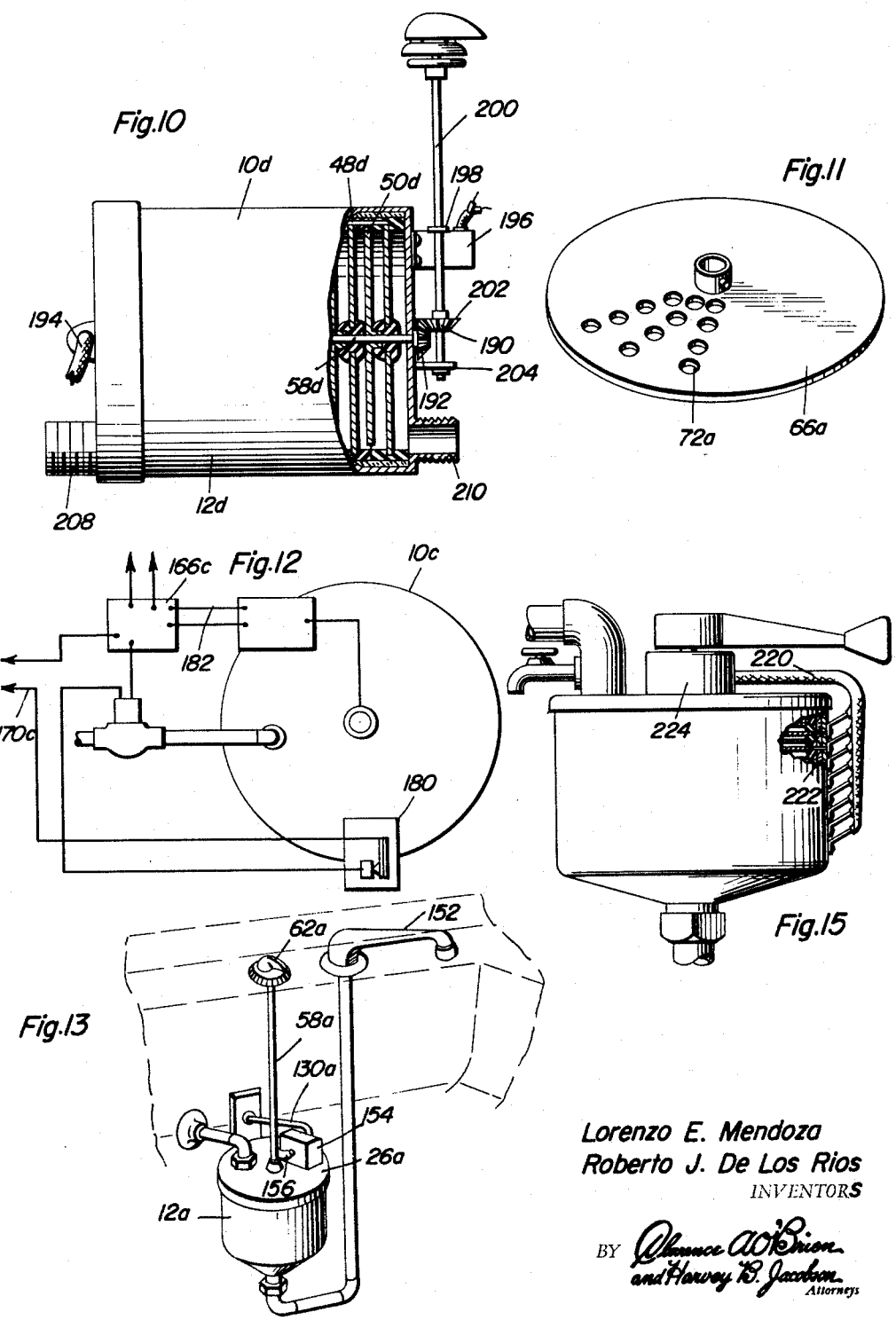

United States Patent Office 3,005,083
Patented Oct. 17, 1961

3,005,083
ELECTRO-HEATER
Lorenzo E. Mendoza and Roberto J. De Los Rios, both of 310 E. Adalee, Tampa, Fla.
Filed Oct. 29, 1958, Ser. No. 770,447
14 Claims. (Cl. 219—40)

This invention relates to electrical heaters and more particularly to a heater for liquids, especially water.

An object of the invention is to provide an electrically operative heater of the type which uses a plurality of interleaved plates energized from opposite sides of a line and wherein the spacing between the plates provides a copious area for liquid contact. A heater constructed in accordance with the invention furnishes excellent control of the outlet temperature of the water. Therefore, in a dwelling or any other place, such as an office building, motel, etc., it will be unnecessary to have individual or central water heating plants and the hot water plumbing appertinent thereto.

A heater constructed in accordance with the invention may be attached to the cold water supply pipe and adjusted so that the water outlet is cold. Alternatively, by a minor adjustment, for instance turning a pointer, the selected outlet temperature of the water is obtained. Not only does the heater constructed in accordance with this invention avoid the necessity of hot water plumbing systems and plumbing, but it also functions to take the place of mixing valves for hot and cold water because the precise temperature level of the water may be carefully controlled.

The principles of the invention are applicable in many environments and for many uses. Obviously only a few can be mentioned herein, but it is to be clearly understood that the liquid heated need not necessarily be water, and the heated liquid need not necessarily be directly used. It may be used indirectly, for instance for cooking, heating small space heaters, heating radiators and many others. The temperature rise of the water may be made almost instantaneous by having a high current density between plates in the heater.

An important feature of the invention is found in the ability of the construction to enable cool or cold water to pass completely through the unit without being heated at all. Secondly, the water may be heated to any selected temperature by a simple adjustment. Further, the electrical consumption is only that necessary to heat the water since, no current flows in the absence of water in the heating unit.

Another important feature of the invention is to provide an overflow for purging the unit of water after it is used. This may assume the nature of a small tube attached to the pressure chamber portion of the heater housing and to the upper part of the housing so that when the water supply is discontinued, a suction is automatically drawn at the top of the unit, withdrawing an appreciable and a considerable quantity of liquid that would ordinarily accumulate on the plates, from the heating unit. Further, to aid in completely exhausting the unit of water or other vapors when it is not in use there is an automatic purge valve in the unit which opens in response to a discontinuance of pressure in the unit.

The invention may be embodied in simpler basic units or more complex units capable of performing additional functions. For example the units may be made to operate with a thermostatically controlled circuit, a water inlet responsive switch which automatically causes the plates to become energized in response to the application of water under pressure to the unit, and current overload switches may be interposed in any of the systems as an additional safety factor.

A further object of the invention is to provide an improvement in electric heating units of the type discussed above, wherein a quantity of trace mineral, for example salt, is added to the water in response to the flowing of water past a porous wall dividing a supply of salt from the interior of the water chamber. The salt has the advantage of causing the heating of the water to take place much more rapidly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a largely diagrammatic view showing a conventional sink in cross-section and a heater in accordance with this invention operatively connected therewith in but one of the numerous ways which the heater may be used.

FIGURE 2 is a view taken approximately along the line 2—2 of FIGURE 1.

FIGURE 3 is an enlarged cross-sectional view taken on the line 3—3 of FIGURE 2.

FIGURE 4 is a fragmentary sectional view taken on the line 4—4 of FIGURE 3 and showing only one of numerous possible ways of running the electrical wiring for the heater.

FIGURE 5 is an enlarged sectional view taken on the line 5—5 of FIGURE 2 and showing the means for introducing a quantity of salt to the water.

FIGURE 6 is an enlarged sectional view taken on the line 6—6 of FIGURE 2 and showing the purge valve.

FIGURE 7 is a perspective view of one of the plates that constitutes an electrode in the heater.

FIGURE 8 is a perspective view of another of the plates constituting a different electrode.

FIGURE 9 is a diagrammatic view showing one method of a more elaborate control for the electrical circuit associated with the heater.

FIGURE 10 is an elevational view, parts broken away in section to illustrate internal detail, of a modification showing that the angularity of the unit may be altered.

FIGURE 11 is a perspective view of a modification of the electrodes.

FIGURE 12 is a diagrammatic view showing another electrical circuit for the heater.

FIGURE 13 is a perspective view showing a further modification of the invention.

FIGURE 14 is a sectional view taken on the line 14—14 of FIGURE 6.

FIGURE 15 is another modification.

In the accompanying drawings there is a heater 10 showing one modification of the heater. This heater (FIGURES 2 and 3) is made of a housing 12 having a side wall 14 and a bottom wall 16 which slopes to a neck 17 having a discharge opening 18. The neck has a coupling 20 by which pipe 22 is secured in register with the discharge opening for conducting either cool or heated liquid, generally water, from the chamber 24 enclosed by housing 12. The top of the housing has a cover 26 attached to the otherwise open top of the housing. The cover may be screw threaded onto the end of the housing or otherwise attached thereto, and there is preferably a seal 28 between the adjacent surfaces of the cover 26 and the upper edges of the side wall 14. To clean or repair the unit the housing 12 may be disconnected from the cover, leaving the electrical part intact but exposed for cleaning or repair.

Water inlet 30 has a nipple 32 and it is attached to cover 26. A coupling 34 is used to connect liquid supply pipe 36 to the inlet 30 so that liquid under pressure may be applied to the chamber 24. The source of the water or other liquids is immaterial, a domestic installation being shown for illustrative purposes only. In this regard, it is preferred, although not essential, that there be a filter 40 upstream of the water inlet 30, and a good place to have the filter is in the short pipe 36. The filter may be detached for cleaning, and another possibility is to have a sump 42 attached to filter case 44 and a drain valve 46 for the sump. Other filtering methods, of course, may be resorted to.

There are two groups 48 and 50 of preferably flat plates which constitute electrodes. The groups of plates are located in chamber 24. All plates of one group are attached to one side of an electrical service line and the plates of the other group are attached to the opposite side of an electrical service line. The plates are parallel and adjacent with the spaces 52 between the plates accommodating water which functions as a conductor so that electric current flows between adjacent plates of the two groups, causing the water to be heated very rapidly, depending on the current density between plates. The plates in group 48, for instance typical plate 54 (FIGURE 8) may be made of metal or some other conductor, and each is provided with a central aperture in which there is an electrically insulating grommet 56, and a channel section spacer 55 at its edge. The grommets 56 and spacers are each made of insulation such as pressed fiber, plasticor rubber. Spindle 58 is mounted centrally in housing 12, being carried by bearing 60 in an opening in the cover 26. Control handle 62 is attached to the upper extremity of the spindle and is adapted to be moved between hot and cold positions (FIGURE 2). Plate 54 and all other plates in group 48 are stationary inasmuch as grommet 56 for plate 54 and the other grommets slip on the spindle 58 when the spindle is rotated. However, the plates, for example typical plate 66 (FIGURE 7) are securely attached to the spindle by any suitable means. One such means are illustrated as a collar 68 fixed to the center of plate 66 and in alignment with the opening therein. Setscrew 70 is adjustably carried by collar 68 and is adapted to engage the surface of spindle 58. The collar fits into grommet 56 and is rotatable with respect to grommet 56 whereby plate 66 and all others like it in group 50 are rotatable as a unit, while the plate of group 48 remain stationary. In this way there is relative movement between the groups of plates, this being essential to an important feature of this invention.

The plates in each group 48 and 50 are provided with openings 72 and 74 which are aligned with each other and with water inlet 30. The openings 72 and 74 are shown as peripheral notches, although this may be varied as shown in FIGURE 11. In this figure the opening 72a is one of a group of such openings spaced from the periphery of the disk and being in the form of one or more holes, slots, etc. Otherwise plate 66a is identical to plate 66. Plates 54 and 66 have strips 57 and 67 along one notch edge, and they function as water stops limiting the extent of plate area exposed to the water flowing through the heater depending on the adjustment of the plate groups. They cooperate with the spacers 55 to hold the plates parallel, and they function as wipers to clean the plate surfaces as the plates are rotationally adjusted.

When the openings in both groups of plates are in alignment with each other the water passing into inlet 30 may flow directly downward to the lower part of chamber 24 which acts as a pressure equalizing and mixing chamber. Since little or no water is diverted into the spaces between the plates of group 48 and 50, there is little or no heating. In order to obtain a temperature increase for the water passing through the discharge opening 18, handle 62 is rotated thereby moving the notches or other types of openings from alignment with each other and requiring a considerable quantity of the inlet water to be diverted and circulated through portions of the spaces between the electrodes. Therefore, the water remains in the housing a longer period and is subjected to more heating because of this duration increase. The necessary result is that the water is discharged in a hotter condition. The heat of the water may be regulated by regulating the effective area of the pairs of adjacent openings in adjacent electrodes.

The group 48 of electrodes is held stationary in housing 12 by being stacked on their spacers 55 that are frictionally or otherwise attached in the housing. A liner 80 of insulating material covers part of the area of the walls and bottom of the housing and supports lower stationary plate 53 having spindle bearing 59. Bus bar 82 is attached to notches 83 in each of the plates in group 48 to establish electrical continuity and to keep the plates 54 fixed, and there is an additional layer 84 of insulation between liner 80 and the inside surface of the walls of housing 12. Layer 84 has spacers 55 attached to it and is adhered to the inner surface of the housing side wall. The layer 84 may be omitted in which case the spacers 55 are attached directly to the housing side wall.

As shown in FIGURE 5 there is a case 86 containing an inexpensive additive, for example salt 88, and a neck 90 threaded or otherwise secured in an opening 92 in cover 26. A porous wall 90 divides the salt 88 from the flowing water in the housing but enables some of the water to circulate in the small openings in the porous wall so as to extract a small quantity of salt so that heating may be more rapid and increased. Pusher plate 94 is located in casing 86 and is pressed by spring 96 seated thereon and seated against a removable closure 98 on the casing, to maintain the salt 88 under pressure.

As shown in FIGURE 6 there is a normally open valve 100 secured to cover 26. Valve 100 is a purge valve to admit air into the top part of housing 12 and thereby assure complete emptying and rapid emptying of the housing when the water supply is discontinued. In the illustration of FIGURE 3, the water supply is under the control of a conventional spigot. The valve is constructed of a float 102 held captive in valve cage 104 attached to the cover 26 and in registry with an opening 106 in the cover. The float has its extent of travel limited by the wall 108 around opening 106 and a transverse wall 110 extending across the top of valve cage 104. The transverse wall has a valve seat 112 in which the valve element 114 on float 102 is adapted to be disposed when housing 12 is subjected to water under pressure and becomes filled. As soon as the pressure, though, is discontinued, the water level begins to fall and automatically, the float 102 is lowered thereby opening valve 100 for admission of air into the casing.

To further aid in extracting as much water as possible from the interior of the housing and especially the electrodes, there is a bypass tube 116 attached at one end in an opening 118 at the discharge outlet 18 of the housing. The opposite end of the tube is attached in an opening 120 at the top of the housing above the uppermost electrode. Accordingly, after the water supply is cut off and the water in the housing begins to draw a vacuum above the water level in rushing from the housing, air which is laden with liquid is drawn from the top of the housing, through pipe 116 and enters the discharge outlet 18.

For the electrical energization of the electrodes, the simplest arrangement is shown in FIGURE 3, consisting merely of a cable 130 attached to a source of electrical potential. One side of the line is connected via conductor 132 to a binding post 134 on spindle 58. This energizes the plates in group 50. The other side of the line is connected via conductor 134 to a binding post 136 attached to the housing cover 26 and in contact with the upper plate of the group 48 of electrodes. A grommet 138 insulates the electrode 136 from the housing cover 26, and the electrodes in the group are energized by means of conductor 82. This is all that is actually necessary, one possible suggestion for concealing the cable 130 being to have it extend through a sleeve covering 142 around pipe 36. It is unnecessary to use a switch because current will not flow unless there is water in the housing 12. Accordingly, when the faucet is adjusted to the on position, water will flow through inlet 30 and automatically cause current to flow.

More elaborate electrical provision may be made should this be found desirable. Further, the location and use of the unit may be varied considerably. In this regard attention is invited to FIGURE 1 showing a sink 150 with unit 10 connected on the side of the sink. FIGURE 13 shows that spindle 58a may be extended and handle 62a located at the top of the sink near the discharge spout 152. When extending the spindle in this way it is ideally suited for automatically operating switch 154 located on cover 26a. The switch is a conventional switch actuated by a short arm 156 on spindle 58a and engaging the switch operator in response to oscillation of the spindle 58a. Accordingly, when on the "cold" position the switch 154 is open. But when the handle, pointer or the like is moved to a warm or hot position or any intermediate position, the small arm 156 closes the switch so that cable 150 may conduct current to the electrodes in the housing 12a.

Going a step further, the switch may be responsive to the inflow of water instead of adjustment of the temperature control. In FIGURE 9 there is a heater 10b whose spindle 58b is diagrammatically represented as having current conducted thereto by means of wire 160. The binding post 136b has a conductor or wire 162 attached to it, this, as the other wiring, being shown schematically. A current overload type, conventional switch 164 is connected to a source of electrical potential and is operated by the contacts of a low voltage relay 166. The relay has one lead 168 connected directly to it, while the other lead 170 is attached to a normally open switch 172. Wire 174 extends from the normally open switch 172 to the relay to complete the relay circuit. Normally open switch 172 is operated by a flap valve 176 interposed in the water supply pipe 36b upstream of the water inlet of heater. The flap valve has a vane in it mounted pivotally and adapted to be swung by water pressure to an essentially horizontal position at which the movable contact of switch 172 bridges the stationary contacts of this switch and completes the circuit. This energizes the relay which further energizes the safety switch 164 and causes current to flow to the groups of electrodes. The safety overload switch may be used in connection with any or all embodiments of the invention, and the same holds true of thermostat 180 (FIGURE 12) in a slightly more elaborate electrical system.

The electrical system in FIGURE 12 has a circuit 182 and circuit components identical to those disclosed in FIGURE 9 with the exception that lead 170c has normally closed thermostatic switch 180 interposed therein. The thermostatic switch may be adjusted to open at any selected temperature at which relay 166c will function to discontinue current to the groups of plates in heater 10c.

FIGURE 10 demonstrates the fact that the heater may be set at any angle and may be made in slightly different structural organization but still utilizes the principles of the invention. The groups 48d and 50d of electrodes are identical to the electrodes in FIGURE 4. The only essential difference is that the housing is horizontal instead of vertical and the means for adjusting the group 50d of electrodes includes a right angle gear drive 190. A miter gear 192 is attached to spindle 58d, and the spindle is energized by conductor 194 at one end thereof. A part of one side of the line or both sides of the line may be controlled by switch 196 mounted on the housing 12d and operated by a small arm 198 projecting from the same control spindle 200 that has miter gear 202 in engagement with miter gear 192. The spindle 200 is mounted for rotation in a suitable mounting bracket or brackets 204 and has a control pointer, knob, handle, etc. at one end thereof. In this embodiment of the invention the water inlet 208 is at the bottom of the casing, and so is the water outlet 210 to achieve the flow enabling cold, hot or intermediately heated water to be discharged, the temperature being governed by the positions of the plates of the two groups 48d and 50d.

A very simple way to obtain electrical control over the groups of electrodes is to have the heater (FIGURE 15) provided with a cable 220 or other conductor group with one conductor attached to each fixed plate electrode. Although binding posts 222 in the wall and insulated therefrom, are shown as one way of establishing electrical connection between the fixed plates and the conductors of cable 220 (to take the place of bus bar 82) other mechanical arrangements may be used. A multi-position switch 224 is connected to a potential source and to the conductors of cable 220 and operates to energize one or more plates through the conductors of cable 220.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A heater for a source, said heater comprising a housing provided with a liquid inlet and a liquid outlet, a first group of flat electrodes, a second group of flat electrodes interleaved with the electrodes of said first group, means for applying an electric potential to the electrodes of each group, said electrodes of the groups being spaced from each other to provide a liquid passage space across which current flows to heat the liquid, means for adjusting the position of said first group of electrodes with respect to the second group of electrodes, each electrode having an opening in alignment with said inlet and through which water may flow, the openings of said second group of electrodes being moved into and out of registry with the openings of said first group of electrodes, and means on at least some of said electrodes for supporting said electrodes spaced apart and for wiping across some of the electrodes when one group is adjusted with respect to the other group.

2. A heater for a cold water source, said heater comprising a housing provided with a cold water inlet and a water outlet, a first group of flat electrodes, a second group of flat electrodes interleaved with the electrodes of said first group, means for applying an electric potential to the electrodes of each group, said electrodes of the groups being spaced from each other to provide a water occupying space across which current flows to heat the water, means for adjusting the position of said first group of electrodes with respect to the second group of electrodes, and each electrode having an opening in alignment with said inlet and through which water may flow, the openings of said second group of electrodes being moved into and out of registry with the openings of said first group of electrodes, said housing having a pressure equalizing chamber therein connected to said outlet below said groups of electrodes, and a bypass conduit extending between and connecting the upper part of said housing and said chamber.

3. A heater for a cold water source, said heater comprising a housing provided with a cold water inlet and a water outlet, a first group of flat electrodes, a second group of flat electrodes interleaved with the electrodes of said first group, means for applying an electric potential to the electrodes of each group, said electrodes of the groups being spaced from each other to provide a water occupying space across which current flows to heat the water, means for adjusting the position of said first group of electrodes with respect to the second group of electrodes, and each electrode having an opening in alignment with said inlet and through which water may flow, the openings of said second group of electrodes being moved into and out of registry with the openings of said first group of electrodes, said housing having a pressure equalizing chamber below said groups of electrodes, a normally open valve in said housing and which is closed by the pressure in said housing, said valve adapted to automatically open when inlet water is cut off in order to drain said housing.

4. A heater for a cold water source, said heater comprising a housing provided with a cold water inlet and a water outlet, a first group of flat electrodes, a second group of flat electrodes interleaved with the electrodes of said first group, means for applying an electric potential to the electrodes of each group, said electrodes of the groups being spaced from each other to provide a water occupying space across which current flows to heat the water, means for adjusting the position of said first group of electrodes with respect to the second group of electrodes, and each electrode having an opening in alignment with said inlet and through which water may flow, and the openings of said second group of electrodes being moved into and out of registry with the openings of said first group of electrodes, a case connected with said housing and adapted to contain a quantity of salt, and a porous wall dividing said case from said housing so that water flowing by said wall accumulates a quantity of salt from the case.

5. A heater for a cold water source, said heater comprising a housing provided with a cold water inlet and a water outlet, a first group of flat electrodes, a second group of flat electrodes interleaved with the electrodes of said first group, means for applying an electric potential to the electrodes of each group, said electrodes of the groups being spaced from each other to provide a water occupying space across which current flows to heat the water, means for adjusting the position of said first group of electrodes with respect to the second group of electrodes, and each electrode having an opening in alignment with said inlet and through which water may flow, and the openings of said second group of electrodes being moved into and out of registry with the openings of said first group of electrodes, a case connected with said housing and adapted to contain a quantity of salt, and a porous wall dividing said case from said housing so that water flowing by said wall accumulates a quantity of salt from the case, a normally open valve in said housing and which is closed by the pressure in said housing, said valve adapted to automatically open when inlet water is cut off in order to drain said housing.

6. In an electric heater for a cold water supply, a housing provided with a cold water inlet and a water outlet, adjustable electrically operative means in said housing for heating the water passing through said housing to selected temperatures and including a first and a second group of interleaved plates each provided with an opening, said openings when aligned being also in alignment with said inlet and when moved out of alignment requiring the water passing through said housing to take a devious path over and under said plates thereby remaining in the housing a longer time and becoming hotter, and means contacting said plates for wiping across the surfaces thereof to clean the plates of surface accumulations.

7. In an electric heater for a cold water supply, a housing provided with a cold water inlet and a water outlet, adjustable electrically operative means in said housing for heating the water passing through said housing to selected temperatures and including a first and a second group of interleaved plates each provided with an opening, said openings when aligned being also in alignment with said inlet and when moved out of alignment requiring the water passing through said housing to take a devious path over and under said plates thereby remaining in the housing a longer time and becoming hotter, and salt introducing means exposed to the interior of said housing.

8. In an electric heater for a cold water supply, a housing provided with a cold water inlet and a water outlet, adjustable electrically operative means in said housing for heating the water passing through said housing to elected temperatures and including a first and a second group of interleaved plates each provided with an opening, said openings when aligned being also in alignment with said inlet and when moved out of alignment requiring the water passing through said housing to take a devious path over and under said plates thereby remaining in the housing a longer time and becoming hotter, each plate in one of said groups having a seal on each side thereof extending around its peripheral edge for directing and maintaining the flow of water between said plates and through said openings and said electrically operative means including an electric circuit having a switch.

9. The heater of claim 8 wherein said switch is a thermostatic switch.

10. The heater of claim 8 wherein said switch is a current overload switch.

11. The heater of claim 8 wherein said switch is a manual switch.

12. In a heater for liquid flowing from a source of liquid, the combination of a housing, a first group of electrodes in said housing, a second group of electrodes in said housing, one of said groups of electrodes being stationary, means for rotating the electrodes of the other group with respect to the electrodes of said first group, said electrodes having openings adapted to be aligned and moved to misalignment position with respect to each other to provide for substantially free flow of liquid through said housing and to require the liquid to be diverted between said electrodes, said housing having a liquid discharge outlet, means connected with each group of electrodes for energizing said electrodes so that the liquid between electrodes functions as a conductor to produce heat and thereby heat the liquid, an insulating liner in said housing and within which the edges of the electrodes of one of said groups are maintained.

13. In a heater for liquid flowing from a source of liquid, the combination of a housing, a first group of electrodes in said housing, a second group of electrodes in said housing, one of said groups of electrodes being stationary, means for rotating the electrodes of the other group with respect to the electrodes of said first group, said electrodes having openings adapted to be aligned and moved to misalignment position with respect to each other to provide for substantially free flow of liquid through said housing and to require the liquid to be diverted between said electrodes, said housing having a liquid discharge outlet, means connected with each group of electrodes for energizing said electrodes so that the liquid between electrodes functions as a conductor to produce heat and thereby heat the liquid, and means connected to said outlet responsive to the flow of the liquid therethrough and when the liquid under pressure is discontinued from said inlet, for withdrawing residual liquid from said housing and into said outlet.

14. The heater of claim 1 wherein said electrode supporting and wiping means include a strip of insulation along an edge of the opening in one electrode, and said strip forming an abutment which limits the amount of the electrode which is exposed to the liquid as it passes through said housing.

References Cited in the file of this patent
UNITED STATES PATENTS

| | | |
|---|---|---|
| 646,911 | Knox | Apr. 3, 1900 |
| 1,706,146 | Davidsen | Mar. 19, 1929 |
| 1,949,086 | Smith | Feb. 27, 1934 |
| 2,428,445 | Wicks | Oct. 7, 1947 |
| 2,444,508 | Horni | July 6, 1948 |